United States Patent [19]
Wiley

[11] 3,786,823
[45] Jan. 22, 1974

[54] TRUCK WASH APPARATUS

[76] Inventor: Robert B. Wiley, 21630 Knudsen Dr., Grosse Ile, Mich. 48138

[22] Filed: July 19, 1971

[21] Appl. No.: 163,892

[52] U.S. Cl. ................................. 134/45, 134/181
[51] Int. Cl. ............................................. B60s 3/04
[58] Field of Search ...................... 134/45, 123, 181

[56] References Cited
UNITED STATES PATENTS

| | | | |
|---|---|---|---|
| 3,645,282 | 2/1972 | Kurronen | 134/45 |
| 2,756,759 | 7/1956 | Swain | 134/123 X |
| 3,072,130 | 1/1963 | Grabenhorst | 134/123 X |
| 3,481,346 | 12/1969 | McBurnett | 134/45 |
| 3,443,993 | 5/1969 | Lynn et al. | 134/181 X |
| 3,339,563 | 9/1967 | Ordonez | 134/181 X |
| 3,543,774 | 12/1970 | Trasp | 134/123 X |
| 3,604,434 | 9/1971 | Hurst | 134/181 X |

FOREIGN PATENTS OR APPLICATIONS 375,182   6/1932   Great Britain ..................... 134/123

*Primary Examiner*—Robert L. Bleutge
*Attorney, Agent, or Firm*—Barnes, Kisselle, Raisch & Choate

[57] ABSTRACT

A truck wash apparatus comprising a carriage which is movable back and forth over a stationary truck. The carriage supports spray nozzles for washing the truck. The spray nozzles are movable to wash the sides and ends of the truck. One of the spray nozzle arms extends vertically and is supported by a trolley that is movable transversely of the carriage and is indexable to wash the sides and ends of the truck. The carriage is first moved along to wash one side of the truck, the nozzle arm is then indexed and the trolley is moved transversely to wash an end of the truck, the nozzle is then indexed and the carriage is moved to wash the other side of the truck, and the nozzle is then indexed and the trolley moved to wash the other end of the truck.

11 Claims, 9 Drawing Figures

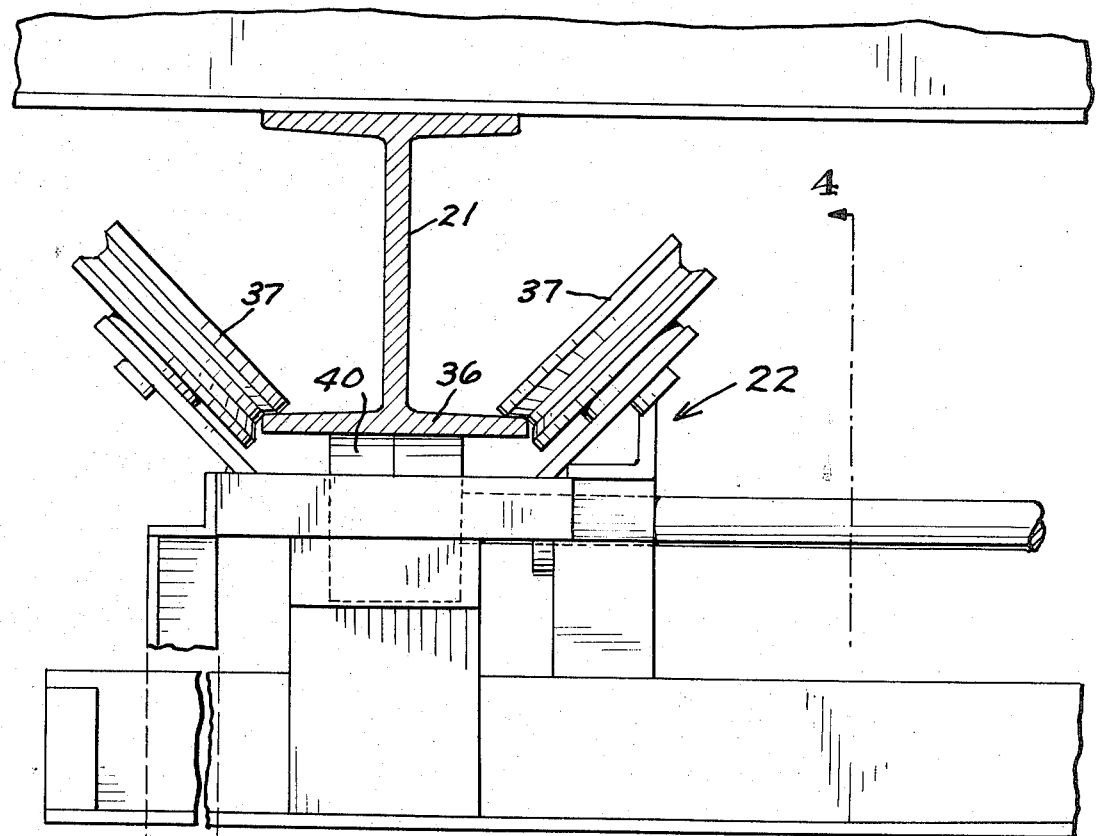
FIG. 3
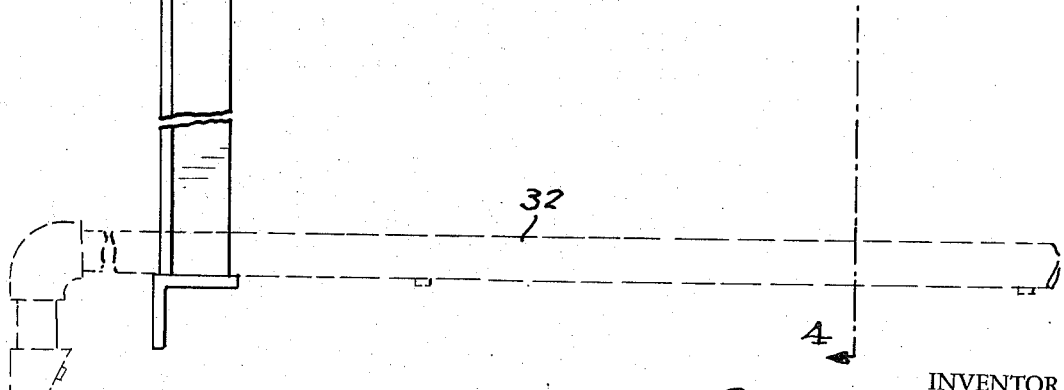

3,786,823

TRUCK WASH APPARATUS

This invention relates to a truck wash apparatus.

BACKGROUND OF THE INVENTION

In washing cars, two types of systems are basically used. In one system, the car is moved through various nozzles and brushes and washed while it is moved. In another type of system, the car is maintained stationary and the nozzles and brushes are moved relative to the car. Neither of these systems is readily adaptable to washing trucks because of the large size of the trucks and the varying lengths thereof.

Among the objects of the present invention are to provide a truck wash apparatus wherein initially detergent is applied to the truck as it is moved into position and thereafter the truck is washed while it is stationary; which will effectively wash trucks of varying lengths; which is relatively simple, effective, efficient, washes both the sides and ends of the truck effectively, and is operable with a minimum of supervision.

SUMMARY

A truck wash apparatus comprising a carriage which is movable back and forth over a stationary truck. The carriage supports spray nozzles for washing the truck. The spray nozzles are movable to wash the sides and ends of the truck. One of the spray nozzle arms extends vertically and is supported by a trolley that is movable transversely of the carriage and is indexable to wash the sides and ends of the truck. The carriage is first moved along to wash one side of the truck, the nozzle arm is then indexed and the trolley is moved transversely to wash an end of the truck, the nozzle is then indexed and the carriage is moved to wash the other side of the track, and the nozzle is then indexed and the trolley moved to wash the other end of the truck.

DESCRIPTION OF THE DRAWINGS

FIG. 3 is a fragmentary part sectional view on an enlarged scale of a portion of the apparatus shown in FIG. 2.

DESCRIPTION

Figure 1:
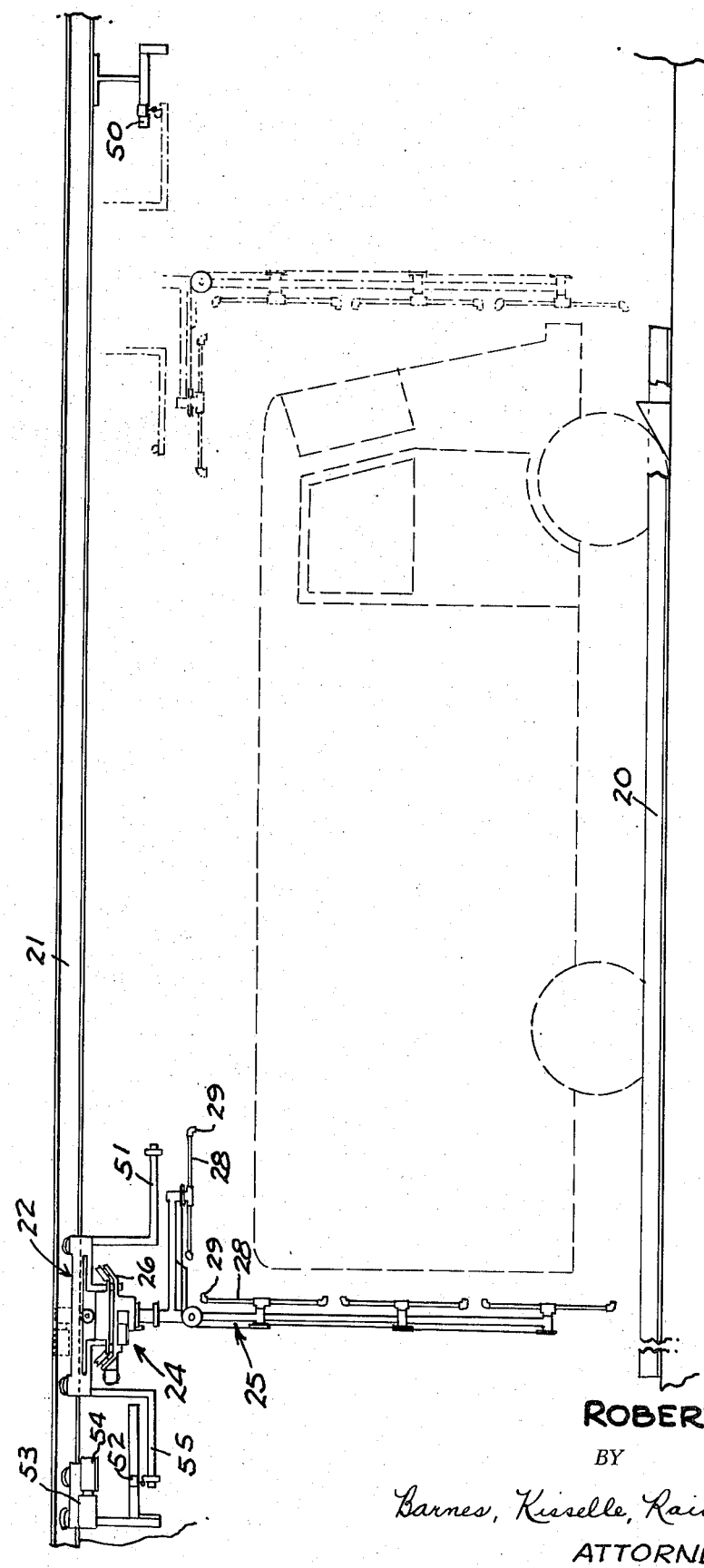
FIG. 1 is a fragmentary side elevational view of a truck wash apparatus embodying the invention.
Figure 2:
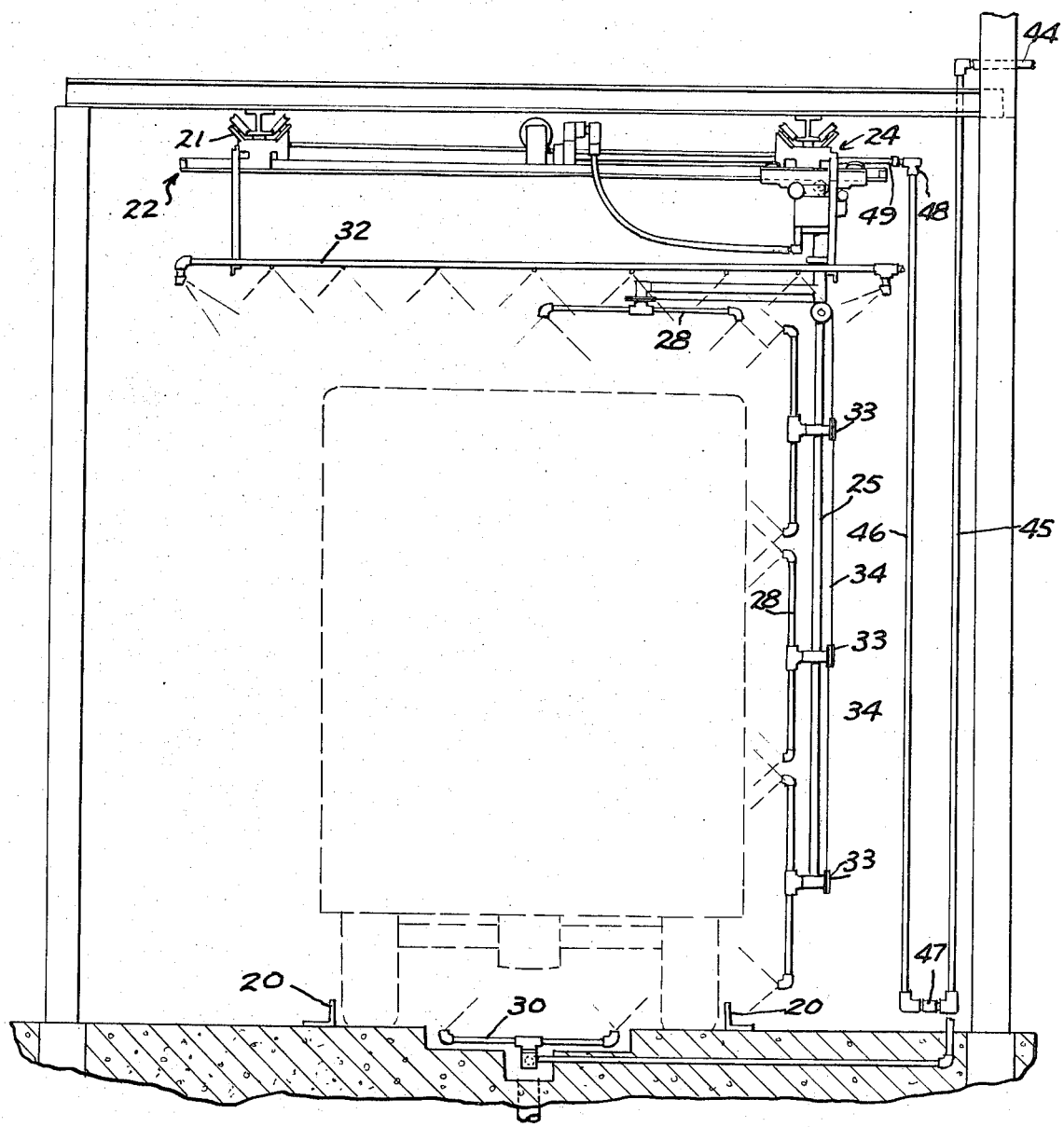
FIG. 2 is a fragmentary rear elevational view of the apparatus.
Figure 6:
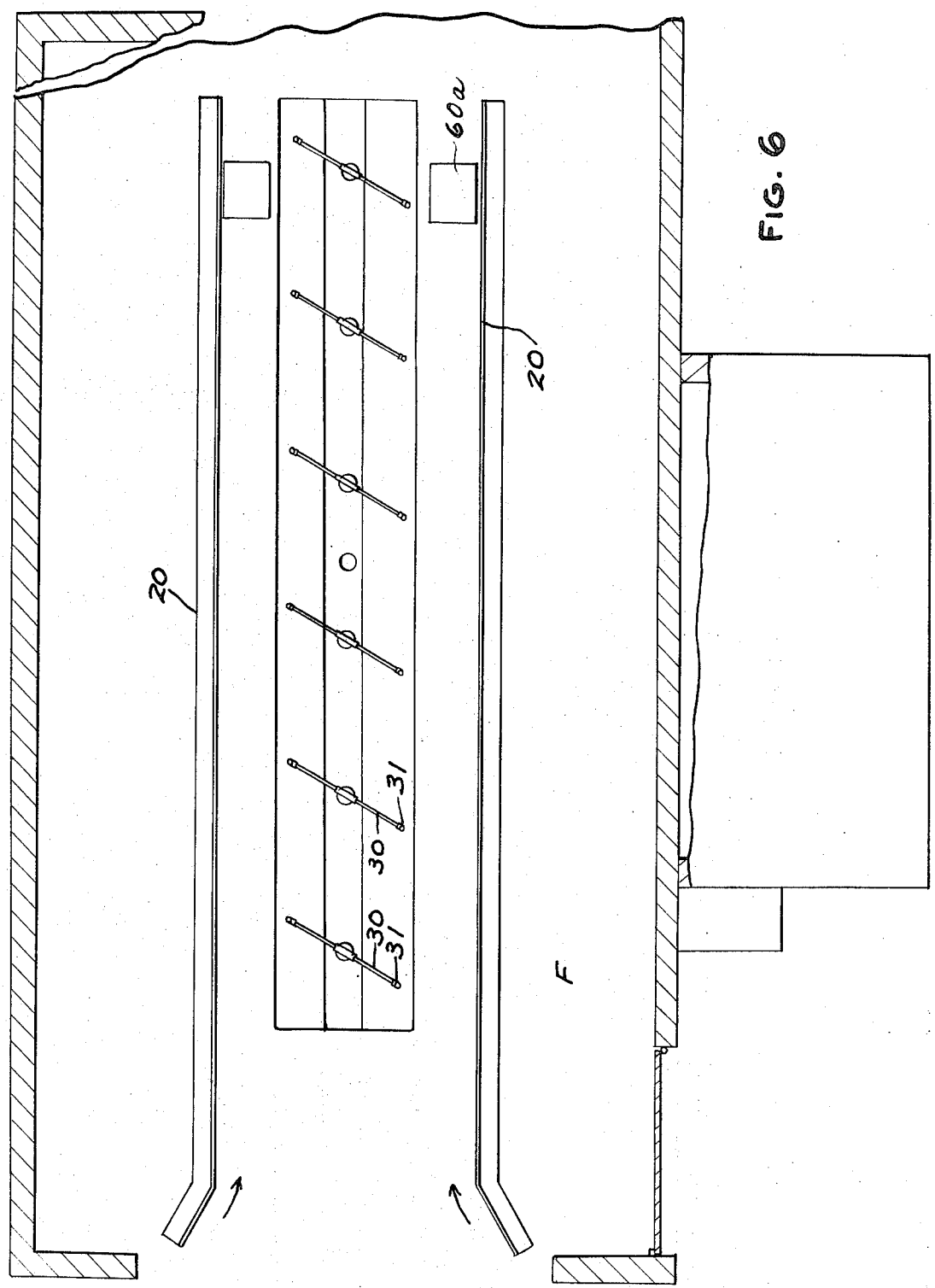
FIG. 6 is a fragmentary plan view of a portion of the apparatus shown in FIG. 1, parts broken away.
Figure 7:
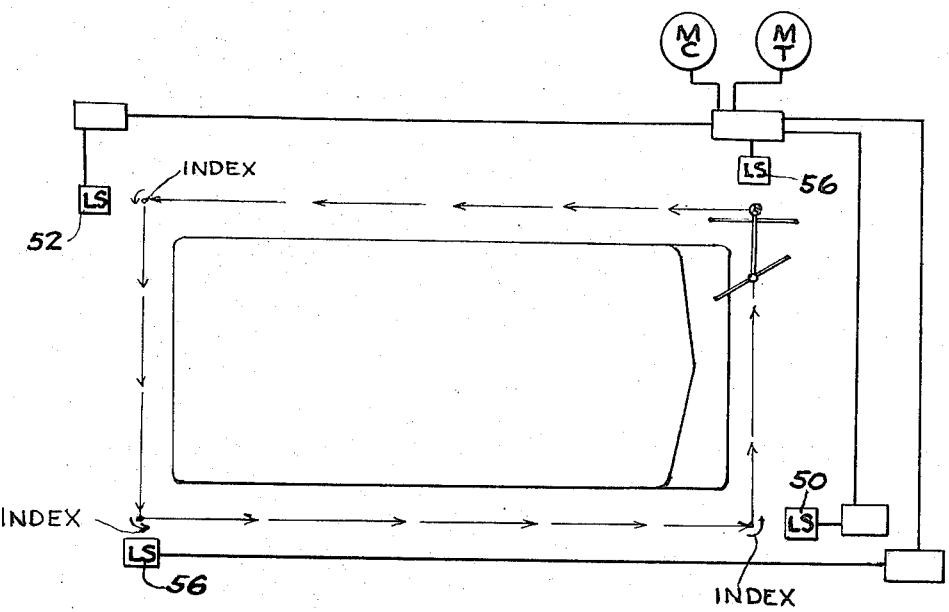
FIG. 7 is a schematic wiring diagram of the apparatus.

Referring to FIGS. 1, 2 and 6, the truck wash apparatus embodying the invention comprises guide rails 20 that are laid on the floor F between which the truck to be washed is driven into position for washing. Spaced stationary tracks 21 are elevated above the floor and support a carriage 22 that is driven by a motor 23 longitudinally back and forth along the tracks 21. A trolley 24 supports 24 supports an indexable L-shaped pipe 25 and is movable transversely along a transverse track 26 by a motor 27. The pipe 25 supports rotatably mounted pipes 28, each of which has angularly related to nozzles 29 thereon so that when water or other liquid passes therethrough, the pipes are rotated. As shown in FIG. 2, each pipe 28 has a shaft that extends outwardly and pulleys 33 are provided and endless belts 34 are trained over the pulleys so that the rate of rotation of the pipes 28 under the action of the water emitted from the nozzles 29 is relatively equalized in order that all of the pipes 28 will rotate at substantially the same angular speed. Carriage 22 further supports horizontal transversely spaced pipes 32 which are utilized for application of acid or other special liquids to the vehicle.

As further shown in this apparatus, rotatably mounted pipes 30 having nozzles 31 thereon are positioned beneath the truck for directing jets of liquid against the bottom of the truck.

Figure 4:
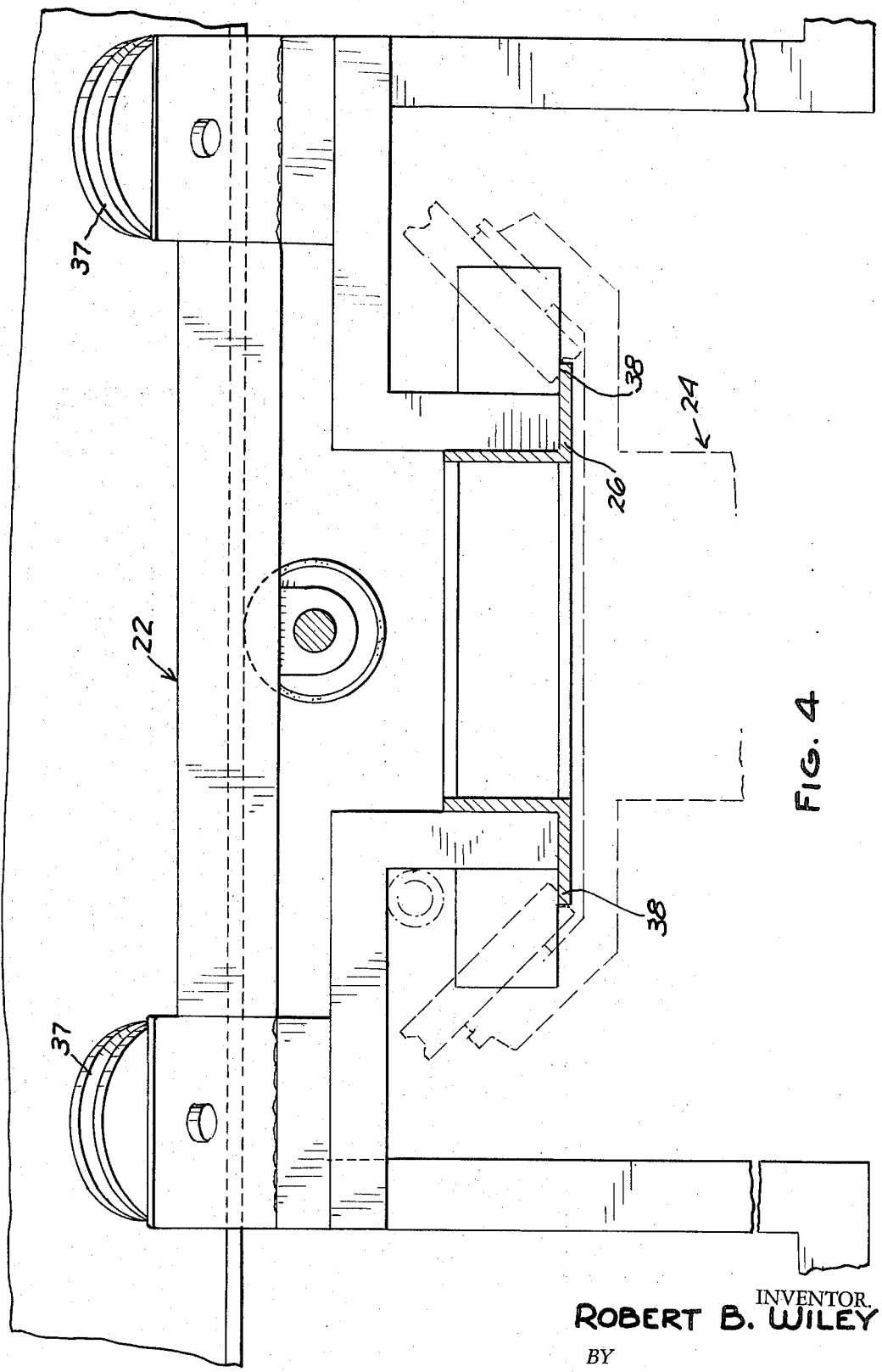
FIG. 4 is a fragmentary sectional view taken along the line 4—4 in FIG. 3.
Figure 5:
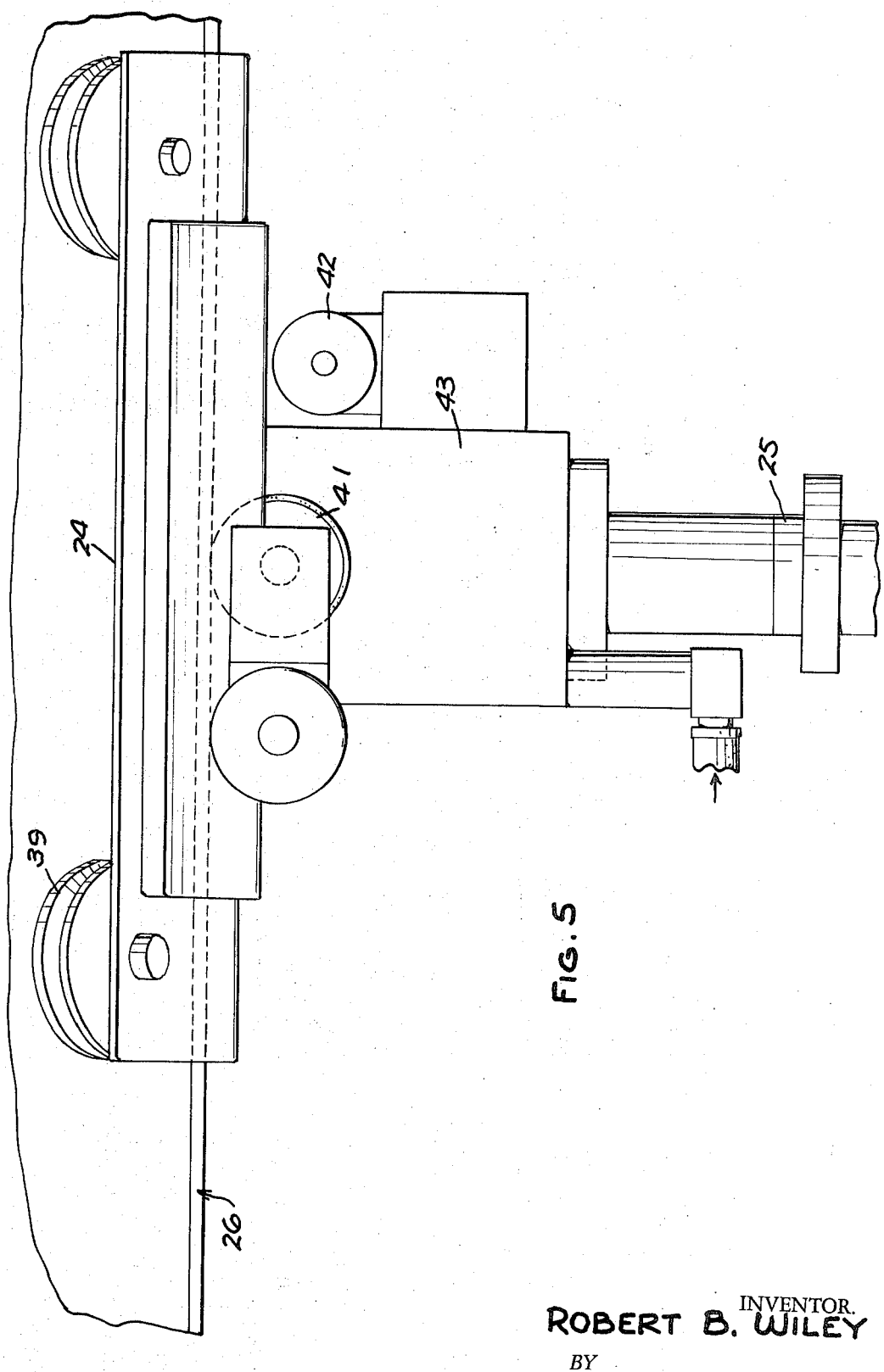
FIG. 5 is a side elevational view of another portion of the apparatus.

Referring to FIGS. 3 and 4, the tracks 21 comprise I-beams and the lower web 36 thereof is engaged by wheels 37 mounted for rotation about inclined axes on the carriage 22. As shown in FIGS. 4 and 5, the track 26 includes outwardly extending flanges 38 that are engaged by grooved rollers 39 mounted for rotation about inclined axes on the trolley 24.

The drive for the carriage is provided by a drive wheel 40 that engages the underside of the flanges 36 of track 21. The drive for the trolley 24 comprises a drive roller 41 that frictionally engages the underside of the track 26. Indexing of the pipe 25 is achieved by an index motor 42 which indexes the pipe 25 in 90° increments through a gear box 43.

Liquid and detergent are supplied to the pipe 25 from an inlet 44 (FIG. 2) to supply pipes 45, 46 that are connected by swivel connections 47, 48 to a pipe section 49 that is connected to the pipe 25 by a flexible conduit. The electrical supply to the motors for moving the carriage and trolley is achieved by fastening the cables and supplying current to the exterior of the pipes 45, 46.

Referring to FIG. 1, a limit switch 50 is provided at one end of the apparatus for engagement by an arm 51 on the carriage. A movable limit switch 52 supported by a trolley 53 driven along the track 21 by a motor 54 is provided at the other end of the apparatus and is adapted to be engaged by a rearwardly extending arm 55 on carriage 22.

The apparatus further includes limit switches 56 on each end of the carriage which are engaged by the trolley as it reaches the end of its movement to provide a signal for operating the indexing motor 42 and energizing the motor 23 to start the movement of the carriage longitudinally of the truck.

In use, the driver of the truck moves the truck along tracks 21 to a stop 60a. The person operating the truck wash then moves trolley 53 along one of the tracks 21 until gauging arm 51 is generally aligned with the rear of the truck. The movement of the trolley may be by motor 54 or manually. An appropriate brake (not shown) is then actuated to fix the trolley 53 with relation to the rear of the truck.

Once the carriage is actuated, the pipe 25 is moved along the side of the truck by movement of the carriage 22, thereafter indexed and moved transversely by movement of the trolley 24, indexed again and moved along the other side of the truck by movement of the carriage 22, indexed again and moved across the end of the truck by movement of the trolley 24.

Upon initiation of the operation by the operator, motor 23 is energized to move the carriage longitudinally to wash one side of the truck. When the carriage reaches the end of the truck, arm 51 engages switch 50 that provides an indexing signal for indexing the spray nozzle arm 25 and energizing the motor for moving the trolley transversely to wash one end of the truck. When the trolley reaches the end of its movement, it actuates switch 56 to index the pipe 25 and actuates the motor 23 in a reverse direction to wash the other side of the truck. When the carriage reaches the other end of its movement, switch 52 is energized to provide an indexing signal and a signal to energize the motor to move the trolley 24 to wash the other end of the truck. A timing mechanism, not shown, is provided to permit repetition of the cycle as many times as needed. In addition, timing mechanism is provided to provide for the change of liquid supplied, that is, so that detergent can be supplied on an early cycle and water can be supplied on a later cycle of the carriage and trolley.

Figure 8:
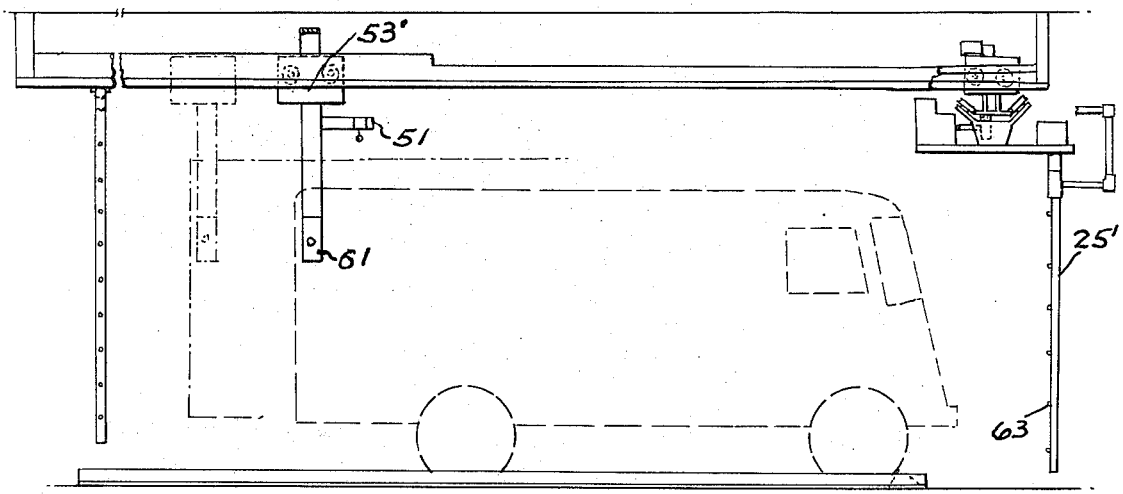
FIG. 8 is a side elevational view of a modified form of a truck wash apparatus.
Figure 9:
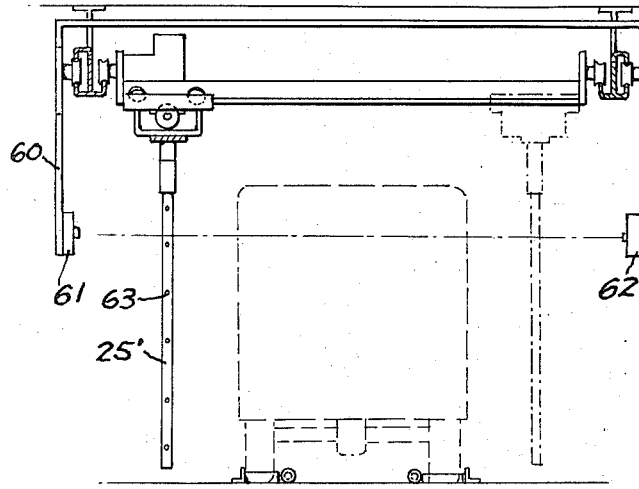
FIG. 9 is a rear elevational view of the same.

In the form of the invention shown in FIGS. 8 and 9, the structure is substantially the same except that trolley 53' includes a bridge 60 that supports a source 61 of light that projects a beam transversely to a light sensitive cell 62 on the bridge 60. When the truck is moved into position, the trolley 53 which supports the arm 51 is moved forwardly until the light beam is interrupted which de-energizes the motor that drives trolley 53' thereby positioning the arm 51. The apparatus shown further differs in that the spray pipe 25' has spray nozzles 63 mounted directly thereon.

I claim:

1. In a truck wash apparatus, the combination comprising means defining an overhead longitudinally extending track,
    a carriage having a transverse track thereon,
    power operated means for reciprocating said carriage along said overhead track,
    a trolley movable transversely along said transverse track of said carriage,
    power operated means for reciprocating said trolley along said carriage,
    a generally vertical member indexably mounted on said trolley and supporting a plurality of nozzles through which fluid can be directed against the truck,
    means for indexing said member with respect to said trolley so that the spray nozzles direct fluid inwardly toward the truck in any position of the carriage and trolley.

2. The combination set forth in claim 1 including means for cyclically operating said carriage and trolley such that as the carriage is moved longitudinally of the track, the trolley is to one side or the other of the truck to be washed and the nozzles are indexed so that they extend in a direction such that fluid may be directed against the side of the truck when the carriage is moved in one direction, and when the carriage is moved in the other direction, fluid may be directed against the opposite side of the truck, and when the carriage is stopped adjacent the end of the truck, the nozzles are indexed so that fluid may be directed against the end of the truck and the trolley is operated along the transverse track to move the nozzles transversely across the end of the truck.

3. The combination set forth in claim 1 including means for cyclically operating said carriage and trolley such that when the carriage is interrupted in its movement adjacent one end of the truck, the trolley is moved transversely and the nozzles are indexed to direct fluid toward the truck to wash one end of the truck, the trolley is thereafter interrupted adjacent the other side of said carriage, the carriage is thereafter moved along said track in an opposite direction and the nozzles are indexed to direct fluid against the other side of the truck, the carriage is interrupted in its movement at the other end of the truck, the trolley is moved transversely in the opposite direction and the nozzles are indexed to direct fluid against the other end of the truck.

4. The combination set forth in claim 1 including means responsive to the movement of the carriage to each end of its travel along the track for indexing the nozzles.

5. The combination set forth in claim 4 including means responsive to the movement of the carriage to each end of the overhead track for causing said trolley to move along the transverse track from one side of the carriage to the other.

6. The combination set forth in claim 1 including means on said carriage for directing another liquid against the truck as the truck is moved through said carriage to a truck washing position.

7. The combination set forth in claim 1 including means adjustably mounted on said overhead track means and movable therealong to provide an adjustable stop.

8. The combination set forth in claim 7 including power means for moving said last-mentioned means.

9. The combination set forth in claim 8 including sensing means mounted thereon for determining the end of a truck.

10. The combination set forth in claim 1 wherein said nozzles are mounted on pipes rotatably mounted on said member,
    said nozzles being positioned such that emission of fluid therefrom causes rotation of said pipes,
    and means interconnecting said pipes such that they tend to rotate in a synchronized fashion.

11. The combination set forth in claim 10 including a second member extending generally horizontally and having nozzles mounted thereon by rotatable pipes,
    said last-mentioned pipes being synchronized in tbeir rotation with the other rotating pipes.

* * * * *